March 2, 1954
C. D. BRANSON
2,670,900
CONSTANT FLOW THERMOSTATIC CONTROL VALVE
Filed March 16, 1951
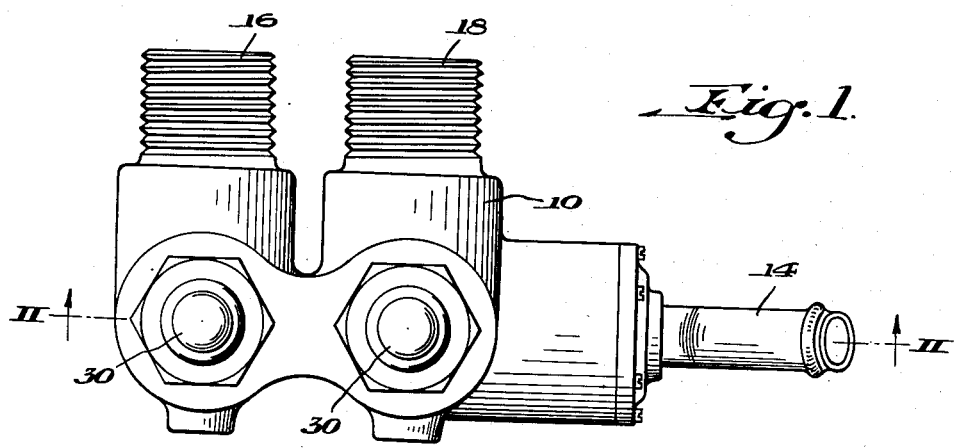
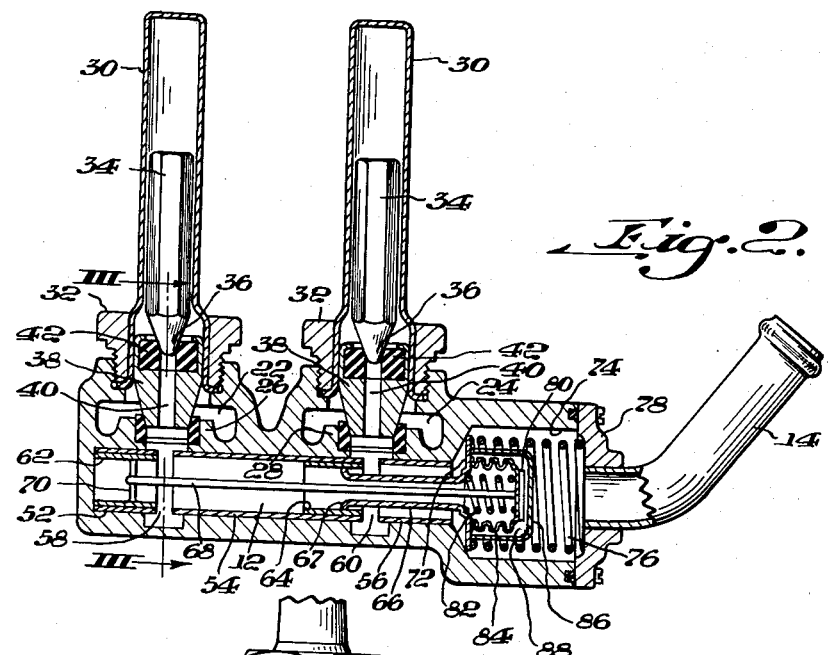
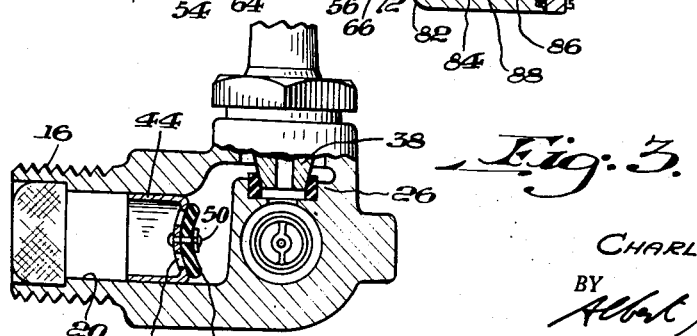
INVENTOR.
CHARLES D. BRANSON.
BY Albert J. Henderson
his
ATTORNEY.

Patented Mar. 2, 1954

2,670,900

UNITED STATES PATENT OFFICE 2,670,900

CONSTANT FLOW THERMOSTATIC CONTROL VALVE

Charles D. Branson, Knoxville, Tenn., assignor to Robertshaw-Fulton Controls Company, Greensburg, Pa., a corporation of Delaware Application March 16, 1951, Serial No. 215,992

11 Claims. (Cl. 236—12)

This invention relates to constant flow thermostatic control valves and more particularly to combined stop and flow control valves constituting a unit for stopping and controlling the flow of liquid derived from a plurality of sources and delivered to a single place of consumption. While embodiments of the invention are susceptible to a variety of uses as will be apparent to those skilled in the art, the invention has particular utility when applied as a valve unit for controlling flow of either hot water, cold water or a mixture thereof to a washing machine and accordingly will be explained as applied thereto.

In my copending application Serial No. 71,635, filed January 19, 1949, a simple non-thermostatic valve mechanism unit is disclosed as including a single housing providing therein a single outlet passage and a pair of inlet passages for respective connection to sources of hot and cold water and a valve port connecting each of said inlet passages with said outlet passage. An independently actuated valve mechanism is associated with each of said ports, said valve mechanisms being operable independently to open communication between either or both of said inlet passages and said outlet passage. Means are provided in said housing for maintaining a constant flow of water therethrough whether either or both of said valve mechanisms are open.

The present invention combines the function of controlling flow in a valve of the described type with the function of controlling the temperature of the mixed water. Thus, a tubular valve seat is mounted in the outlet passage having a pair of ports aligned with the valve ports connecting each of the inlet passages respectively. A pair of valve members is reciprocable in said tubular valve seat for opening and closing the ports respectively. The constant flow means in this embodiment comprise pressure responsive means carried by the valve members and being responsive to fluid pressure in the outlet passage for operating the valve members and maintaining the desired constant rate of flow. Thermostatic means including an expansible member are operably associated with the pressure responsive means for moving one of the valve members relative to the other for varying the ratio of hot water to cold water as the pressure responsive means regulates the flow to a constant rate. Hence, the water flowing from the outlet passage is maintained at a constant rate of flow and at a constant temperature determined by the thermostatic means.

In addition to the foregoing objects and advantages, the valve unit is small and compact for accomplishing the dual functions. Being composed of relatively simple parts that are inexpensive to manufacture and assemble, the valve is economical in first cost and in upkeep.

Other objects and advantages will become apparent from the following description taken in connection with the accompanying drawings wherein:

Fig. 1 is a plan view of an embodiment of the present invention;

Fig. 2 is a cross-section taken on the line II—II of Fig. 1; and

Fig. 3 is a partial section taken on the line III—III of Fig. 2.

The valve mechanism comprises a single housing 10 having a single outlet passage 12 with which may communicate any suitable conduit 14 for conveying liquid from the housing 10 to the place of consumption, as for example, a washing machine.

The housing 10 is provided with a pair of inlet nipples 16, 18 here shown as threaded for connection with any suitable conduits as for example conduits leading from a source of cold water and a source of hot water respectively. Each of the nipples 16, 18 has a passage 20 communicating respectively with a pair of valve chambers 22, 24 having hollow valve seats 26, 28 respectively formed therein. Each of the hollow valve seats 26, 28 is controlled by a solenoid-operated valve member which may be identical in construction and operation wherefore only one will be described in detail. Thus, an elongated tubular casing 30 is flanged at its inner end and a ring nut 32 is provided to engage such inner end and retain the tubular casing 30 in position on the housing 10. The casing 22 constitutes a core on which the coil of a solenoid (not shown) may be wound as is well known to those skilled in the art. An armature 34 is freely slidable in and guided by the inner wall of the casing 30 and is provided with a generally conical end 36.

The inner end of the tubular casing 30 is enlarged within the nut 32 to accommodate a valve member 38 for free slidable movement therein. The valve member 38 has an axial passage 40 extending therethrough and provided at its upper end with a counterbored portion containing a valve seat member 42. The conical end 36 of the armature 34 is adapted to seat upon the valve seat member 42 which is of suitable elastic material to provide yieldable engagement therebetween. The valve member 38 has a conical end for operative engagement with the valve seat member 26 for controlling the flow of fluid between the inlet passage 20 and the outlet passage 12. It should be observed that the valve member 38 has sufficient clearance relative to the wall of the tubular casing 30 to provide a bleed opening for permitting fluid to flow therebeyond into tubular casing 30 when the valve member 38 is in open position.

When the solenoid coil is energized to lift the armature 34, liquid in the tubular casing 30 may flow freely therefrom through the axial passage 42 into the outlet passage 12. An unbalanced pressure is therefore set up on the valve member 38 due to the conical seating surface thereof being subjected to the pressure in the chamber 22 while the opposite end face thereof is subjected to the lower pressure in the outlet passage 12 by way of the axial passage 42. Consequently, a valve member 38 is lifted to permit fluid to flow freely from the chamber 22 into the outlet passage 12. When the solenoid is deenergized, however, the armature 34 is released to engage the conical end 36 with the valve seat 42 and thereby close the outlet from the tubular casing 30 through the axial passage 40. Fluid flowing through the clearance between the valve member 38 and the wall of the tubular casing 30 accumulates in the tubular casing 30. Since this fluid is at substantially the same pressure as the fluid in the chamber 22, an unbalanced pressure is developed on the valve member 38 to cause the valve member 38 to move into engagement with its valve seat 26.

As each of the inlet passages 20 has a solenoid-operated valve functioning as described, energization of either solenoid for respectively actuating the associated valve member 38 to open position will result in either cold water or hot water from the nipples 16, 18 respectively being admitted to the common outlet passage 12. If both solenoids are energized and both valves 38 are open, then a mixture of hot and cold water is introduced into the common outlet passage 12.

As shown in Fig. 3, a cup-shaped member 44 engages the wall of the inlet passage 20 and is provided in its bottom wall with a plurality of apertures 46. A flexible disc 48 formed of any suitable material such as rubber or neoprene is secured to the bottom wall over the apertures 46 by a pin or rivet 50. The disk 48 is of sufficient area to close the apertures 46 and constitute therewith a check valve to prevent reverse flow of the fluid through the inlet passage 20 when back pressure is present. However, the disk 48 is sufficiently flexible to move away from the apertures 46 and permit flow therethrough upon fluid pressure being applied to the disk 48 through the apertures 46.

As previously indicated, a constant flow of fluid is maintained in the outlet passage 12 notwithstanding any variations of pressure of the fluid entering the inlet passages 20. To this end, the outlet passage 12 is provided with a plurality, in this instance three, tubular valve seats 52, 54, 56 which are spaced one from the other to provide a pair of annular ports 58, 60 aligned with the hollow valve seats 26, 28 respectively. It will be understood that the tubular valve seats 52, 54, 56 could be integral if desired and provided with suitable openings to form the ports 58, 60 at the desired locations. It will also be understood that the portion of the outlet passage 12 which contains the tubular valve seats 52, 54, 56 constitutes a third valve chamber.

A pair of sleeve valve members 62, 64 are mounted for reciprocation in the tubular members 52, 54, 56 so that the sleeve valve member 62 controls passage of fluid through the annular port 58 while the sleeve valve member 64 controls flow of fluid through the annular port 60. A hollow valve stem 66 is secured by a spider or cross-arm connection 67 to the sleeve valve member 64 and extends longitudinally through the passage 12 toward the outlet conduit 14. The sleeve valve member 62 is also provided with a valve stem 68 in the form of a rod slidable within the hollow valve stem 66 and terminating therebeyond. The valve stem 68 may be secured to the sleeve valve member 62 by a spider or cross-arm connection 70 as in the case of the valve stem 66 and valve member 64. The sleeve valve members 62, 64 are thus adapted for independent operation, although means to be described are provided for joint operation at certain times.

The constant flow means takes the form of a pressure responsive device operable for moving both the sleeve valve members 62, 64 relative to the annular ports 58, 60 to maintain a constant rate of flow in the outlet passage 12. Accordingly, a disk-like member 72 is formed integrally with the hollow valve stem 66 or may be suitably connected thereto. The disk 72 cooperates with the inner wall of an enlarged chamber 74 formed on the housing 10 at the end of the outlet passage 12 carrying the conduit 14. The periphery of the disk 72 has a predetermined clearance with the wall of the chamber 74 to provide an annular orifice of predetermined area therebetween. Biasing means in the form of a coil spring 76 is operative between the disk 72 and an end cap 78 for the chamber 74 which is secured to the casing 10 and forms a support for the conduit 14.

The thermostatic means for maintaining a constant temperature in the fluid in the outlet passage is operably associated with the pressure responsive means previously described. Thus, the valve stem 68 terminates in an end plate member 80 forming a bearing for one end of a coil spring 82 having its other end engaging the disk 72. An expansible member 84 forming a bellows element is secured at one end to the disk 72 and at the opposite end to the plate member 80 for connecting the adjacent ends of the valve stems 66, 68 together. The thermostatic device is completed by the provision of a cup-shaped member 86 having its open end secured to the disk 72 and extending around the expansible member 84 to provide therewith a chamber 88. Thus, when the chamber 88 is filled with a fluid such as ether or other fluid found to have suitable vapor pressure characteristics or expansion characteristics, then the expansible member 84 and the cup-shaped member 86 form a cup-type thermostat well-known to the art.

From the foregoing, it is apparent that the coil spring 82 constitutes a thermostat load spring for urging the end plate 80, valve stem 68 and the expansible member 84 toward the bottom of the cup-shaped member 86 in opposition to the fluid charge in the thermostat. On the other hand, the coil spring 76 is a flow control load spring serving to react against the disk 72 to bias the entire assembly of disk 72, thermostatic device and sleeve valves 62, 64 to the left as viewed in Fig. 2. Since the wall of the chamber 74 is formed on a diameter larger than the diameter of the disk 72 a clearance is provided therebetween which remains the same size regardless of the position of the disk 72 under the biasing movements described.

*Operation*

When the solenoid valves are energized to open the valve members 38, then cold water flows into the annular port 58 through the sleeve valve 64 to mix with the hot water which is flowing through the annular port 60. The mixed water flows on through the tubular member 56 around the disk 72 and the thermostatic device to the outlet conduit 14. When the flow of mixed fluid around the disk 72 reaches a certain rate, then the pressure drop across the disk 72 will be sufficient to act on the area of the disk 72 and create a force in excess of the load on the spring 76. Under such conditions, the bias of the spring 76 will be sufficiently overcome to allow the disk 72 to move to the right, as viewed in Fig. 2. Consequently, the sleeve valves 62, 64 will be moved to a position which tends to throttle the flow through the annular ports 58, 60 respectively and prevent the flow from increasing. This same balance between the pressure drop across the disk 72 acting on the area of the disk 72 and the load of the spring 76 acts to maintain a constant rate of flow regardless of supply pressures.

The temperature control device does not affect the functioning of the constant flow device as previously described. However, due to the inclusion of thermostatic means operably associated with the constant flow means, a constant temperature in the fluid in the outlet passage can be maintained. Thus, if the temperature of the mixed fluid is too high, then the fluid in the chamber 88 will expand to contract the member 84 and overcome the bias of the spring 82, thereby increasing the distance between the sleeve valves 62, 64. This increase in distance causes the disk 72 in regulating the flow to a constant rate to move the sleeve valves 62, 64 to a position nearer the closed position relative to the annular ports 58 and 60. Hence, the ratio of hot water to cold water making up the fixed total flow will be decreased. This increase in the proportion of cold water and decrease in proportion of hot water tends to bring the temperature of the mixed fluid to that temperature for which the thermostat is calibrated and produce equilibrium of both temperature and flow.

If the temperature of the mixture is too cold, then the fluid in the chamber 88 will contract causing an expansion of the member 84 so that the bias of the spring 82 moves the valve stem 68 relative to the valve stem 66 to decrease the distance between the sleeve valves 62, 64. Consequently, the disk 72 is caused to throttle the cold water and increase the flow of hot water which is a reverse action from that previously described. Consequently, this change in the proportion of hot and cold water tends to increase the temperature of the mixed fluid.

It is apparent that the thermostatic device and the constant flow device will act in the same manner to deliver mixed fluid at a fixed rate of flow and at constant temperature regardless of variations in hot and cold water supply temperatures and pressures, or variations in the difference between the hot and cold water pressure. A simple, compact, valve unit has been provided composed of parts which are easy to fabricate and assemble and, at the same time, the unit comprises a highly efficient constant flow thermostatic hot and cold water mixing valve.

Various changes may be made in the details of construction and arrangement of parts within the scope of the appended claims.

I claim:

1. Valve mechanism comprising a housing having a plurality of inlet passages for fluids of different temperatures having an outlet passage for fluid intersected by a valve chamber, a valve seat in said chamber and having port means affording communication between said passages, valve means cooperable with said seat for opening and closing said port means, means carried by said valve means and responsive to fluid temperatures in said chamber for operating said valve means and maintaining a constant fluid temperature in said chamber and constant flow mechanism in said chamber operatively connected to the assembly of said valve means and said thermally responsive means for adjusting the same to position said valve means to maintain a constant rate of flow to said outlet passage.

2. Valve mechanism comprising a housing having a plurality of inlet passages for fluids of different temperatures and an outlet passage for fluid intersected by a valve chamber, a valve seat in said chamber and having port means affording communication between said passages, valve means cooperable with said seat for opening and closing said port means, pressure responsive means carried by said valve means and cooperable with a wall of said chamber for defining an orifice of predetermined area, means for biasing said pressure responsive means in a direction for operating said valve means to open said port means, said biasing means being adapted to be overcome by fluid pressure in said chamber for maintaining a constant rate of flow in said outlet passage, and thermostatic means carried by said valve means for adjusting said valve means to control the proportions of inflow through said inlet passages respectively for maintaining a constant temperature in the fluid in said outlet passage.

3. Valve mechanism comprising a housing having a pair of inlet passages for hot and cold fluid respectively and an outlet passage for mixed fluid, said housing having a chamber intersecting said inlet and outlet passages, a valve seat in said chamber and having a pair of ports affording communication between said inlet passages respectively and said outlet passage, a pair of valve members cooperable with said seat for opening and closing said ports respectively, separate valve stems for said valve members for independent operation thereof, thermostatic means responsive to the temperature of said mixed fluid including an expansible member connecting said valve stems and operable for moving one of said valve members relative to the other, and means responsive to fluid pressure in said outlet passage and operable for moving both said valve members relative to said ports to maintain a constant rate of flow in said outlet passage at a constant temperature determined by said thermostatic means.

4. Valve mechanism as claimed in claim 3 wherein said pressure responsive means is cooperable with a wall of said chamber for defining an orifice of predetermined area, and means for biasing said pressure responsive means in a direction for operating both said valve members to open said ports, said biasing means being adapted to be overcome by fluid pressure for maintaining said constant rate of flow in said outlet passage.

5. Valve mechanism comprising a housing having a pair of inlet passages for hot and cold fluid respectively and an outlet passage for mixed fluid, said housing having a chamber intersecting said inlet and outlet passages, a tubular valve seat in said chamber and having a pair of annular ports affording communication between said inlet passages respectively and said outlet passage, a pair of sleeve valve members reciprocable in said seat for opening and closing said ports respectively, separate valve stems slidable one within the other and secured at one end thereof to said valve members respectively for independent operation thereof, thermostatic means responsive to the temperature of said mixed fluid including an expansible member connecting the opposite ends of said valve stems together and being operable for moving one of said valve members relative to the other, means operably associated with said thermostatic means for biasing said valve members toward each other in opposition to expansive movement of said expansible member, and means movable in response to pressure variations in said outlet passage and operatively connected to both said valve members for moving the same relative to said ports to maintain a constant rate of flow in said outlet passage at a constant temperature determined by said thermostatic means.

6. Valve mechanism as claimed in claim 5 wherein said pressure responsive means includes a disk-like member carried by said other valve stem and being cooperable with a wall of said chamber for defining an orifice of predetermined area, and means operable between said disk-like member and an opposite wall of said chamber for biasing said other valve stem in a direction for operating both said valve members to open said ports, said last biasing means being adapted to be overcome by fluid pressure for maintaining said constant rate of flow in said outlet passage.

7. A valve mechanism unit including a single housing providing a valve chamber communicating with a single outlet passage, a pair of inlet passages for respective connection to sources of hot and cold water and a hollow valve seat connecting each of said inlet passages with said chamber, an independently actuated valve mechanism associated with each of said seats, said valve mechanism being operable between open and closed positions for controlling the water flow between either or both of said inlet passages and said chamber, a valve seat in said chamber having port means affording communication between said passages, valve means cooperable with said last named seat for opening and closing said port means, constant flow valve mechanism operatively connected to said valve means for maintaining a constant rate of water flow to said outlet passage upon operation of either or both of said first named valve mechanisms to said open position, and thermostatic means operably connected to said constant flow valve mechanism for adjusting said valve means to maintain a constant temperature in the water flow from said outlet passage.

8. A valve mechanism including a single housing providing a single outlet passage, a pair of inlet passages for respective connection to sources of hot and cold water and a hollow valve seat connecting each of said inlet passages with said outlet passage, an independently actuated valve mechanism associated with each of said valve seats, said valve mechanism being operable between open and closed positions for controlling the water flow between either or both of said inlet passages and said outlet passage, a tubular valve seat in said outlet passage having a pair of ports aligned with said hollow valve seats respectively, a pair of valve members reciprocable in said tubular valve seat for opening and closing said ports respectively, pressure responsive means carried by said valve members and responsive to fluid pressure in said outlet passage for operating said valve members and maintaining a constant rate of flow through said outlet passage, and thermostatic means responsive to fluid temperatures in said outlet passage and operably connected to said pressure responsive means for adjusting said valve members to maintain a constant temperature in the fluid in said outlet passage.

9. A valve mechanism including a single housing providing a single outlet passage, a pair of inlet passages for respective connection to sources of hot and cold water and a hollow valve seat connecting each of said inlet passages with said outlet passage, an independently actuated valve mechanism associated with each of said seats, said valve mechanism being operable between open and closed positions for controlling the water flow between either or both of said inlet passages and said outlet passage, a tubular valve seat in said outlet passage having a pair of ports aligned with said hollow valve seats respectively, a pair of sleeve valve members reciprocable in said tubular valve seat for opening and closing said ports respectively, separate valve stems for said valve members for independent operation thereof, thermostatic means responsive to fluid temperatures in said outlet passage including an expansible member connecting said valve stems and operable for moving one of said valve members relative to the other, and means responsive to fluid pressure in said outlet passage for moving both said valve members relative to said ports to maintain a constant rate of flow in said outlet passage at a constant temperature determined by said thermostatic means.

10. Valve mechanism as claimed in claim 9 wherein said pressure responsive means is cooperable with a wall of said chamber for defining an orifice of predetermined area, and means for biasing said pressure responsive means in a direction for operating both said valve members to open said ports, said biasing means being adapted to be overcome by fluid pressure for maintaining said constant rate of flow in said outlet passage.

11. Valve mechanism comprising a housing having a plurality of inlet passages for fluids of different temperatures and an outlet passage for fluid intersected by a valve chamber, a valve seat in said chamber having port means affording communication between said passages, valve means cooperable with said seat for opening and closing said port means, constant flow mechanism in said chamber for adjusting said valve means relative to said seat to control the total inflow through said port means and thereby maintain a constant rate of flow to said outlet passage, and means responsive to fluid temperatures within said chamber for adjusting said valve means relative to said seat to control the proportions of inflow to said inlet passages respectively and thereby maintain a constant fluid temperature in said outlet passage.

CHARLES D. BRANSON.

References Cited in the file of this patent

UNITED STATES PATENTS

| Number | Name | Date |
|---|---|---|
| 1,940,090 | Hetherington | Dec. 19, 1933 |
| 2,267,976 | Hermann | Dec. 30, 1941 |
| 2,321,573 | Chace | June 15, 1943 |

FOREIGN PATENTS

| Number | Country | Date |
|---|---|---|
| 253,555 | Switzerland | Mar. 15, 1948 |